United States Patent [19]

(12) United States Patent
Rice

(10) Patent No.: US 8,032,473 B2
(45) Date of Patent: Oct. 4, 2011

(54) GENERALIZED REDUCED ERROR LOGISTIC REGRESSION METHOD

(76) Inventor: Daniel M. Rice, St. Louis, MO (US)

(*) Notice: Subject to any disclaimer, the term of this patent is extended or adjusted under 35 U.S.C. 154(b) by 603 days.

(21) Appl. No.: 12/183,836

(22) Filed: Jul. 31, 2008

(65) Prior Publication Data
US 2009/0089228 A1 Apr. 2, 2009

Related U.S. Application Data

(63) Continuation-in-part of application No. 12/119,172, filed on May 12, 2008, and a continuation-in-part of application No. 11/904,542, filed on Sep. 27, 2007, now abandoned.

(51) Int. Cl.
*G06F 17/00* (2006.01)
*G06N 5/02* (2006.01)
(52) U.S. Cl. .................................................. 706/46
(58) Field of Classification Search ............. 706/46
See application file for complete search history.

(56) References Cited

U.S. PATENT DOCUMENTS
5,825,907 A * 10/1998 Russo ..................... 382/124

OTHER PUBLICATIONS

Ana M. Aguilera, Manuel Escabias, and Mariano J. Valderrama, "Using principal components for estimating logistic regression with high-dimensional multicollinear data", Computational Statistics 7 Data Analysis 50 (2006) 1905-24.*
K. Mehrotra, C. Mohan, and S. Ranka, "Elements of Artificial Neural Networks", MIT Press 2000, pp. 20, 25, and 33.*

* cited by examiner

*Primary Examiner* — David R Vincent
*Assistant Examiner* — Vincent Gonzales
(74) *Attorney, Agent, or Firm* — Polster Lieder Woodruff & Lucchesi, LC

(57) ABSTRACT

A machine classification learning method titled Generalized Reduced Error Logistic Regression (RELR) is presented. The method overcomes significant limitations in prior art logistic regression and other machine classification learning methods. The method is applicable to all current applications of logistic regression, but has significantly greater accuracy using smaller sample sizes and larger numbers of input variables than other machine classification learning methods including prior art logistic regression.

13 Claims, 4 Drawing Sheets

The numbers in each block refer to paragraphs in the Specification which this step of the method describes.

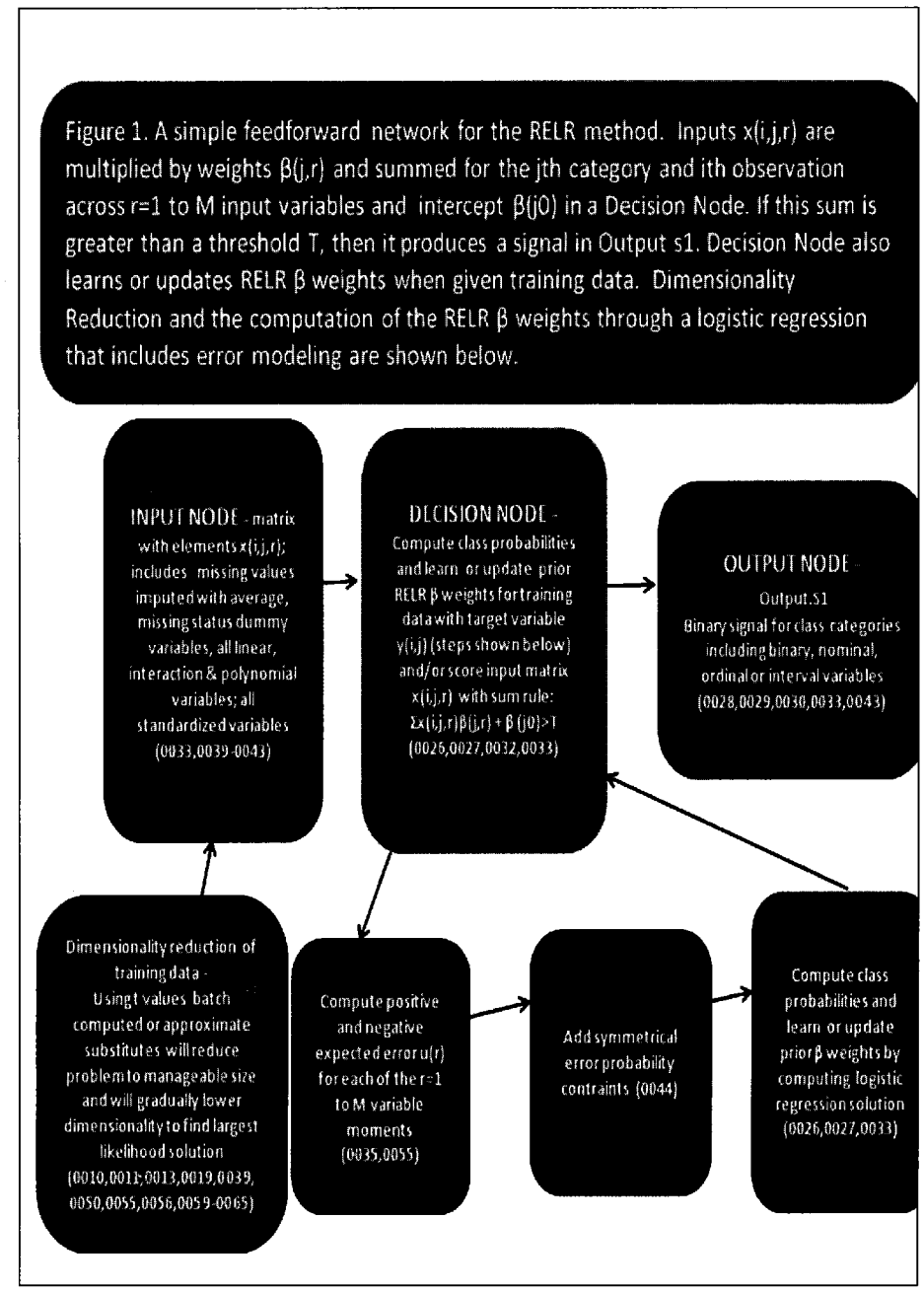

Figure 2: Comparison of "Smaller Sample Pew Model".
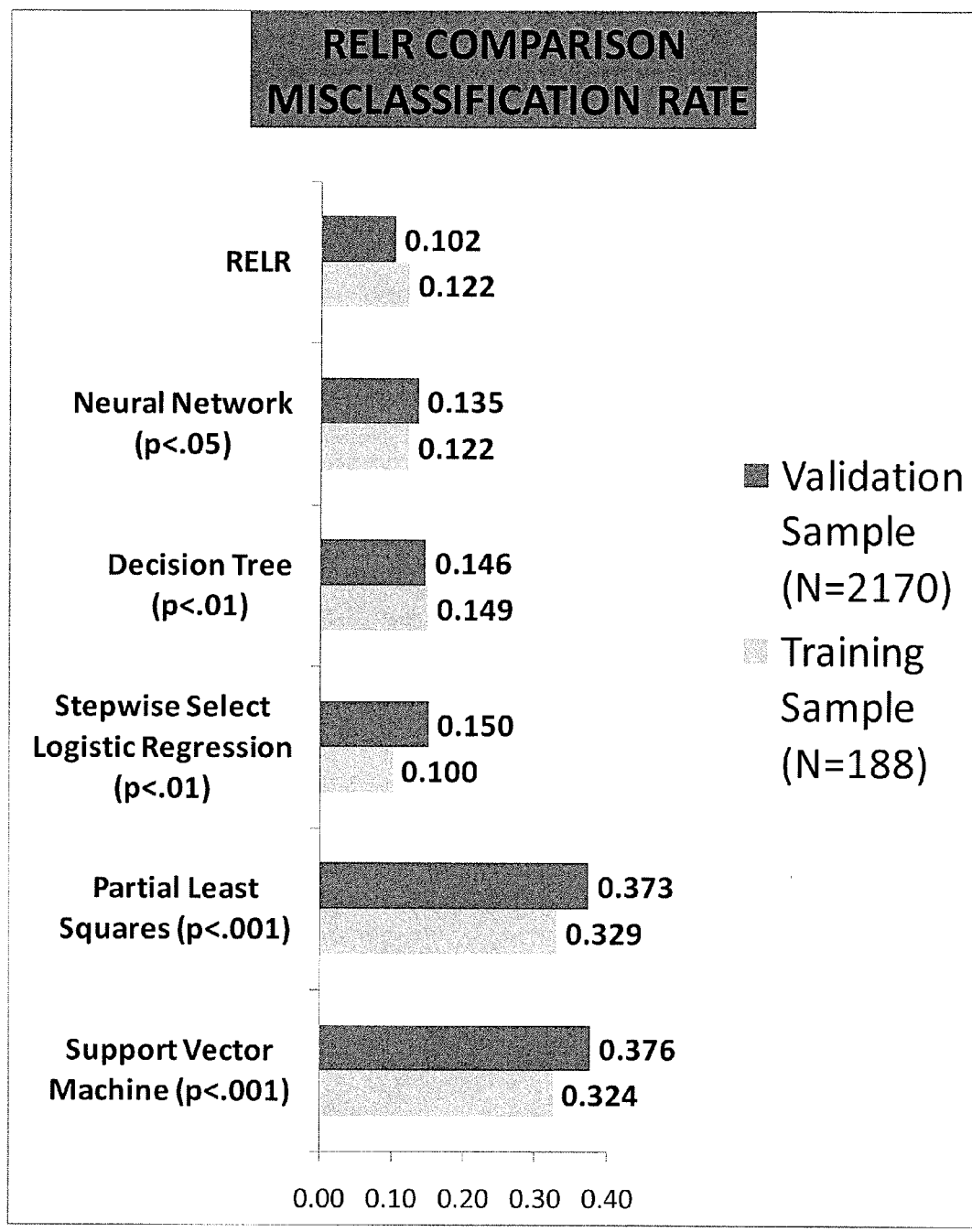

Figure 3: Comparison of "Larger Sample Pew Model".
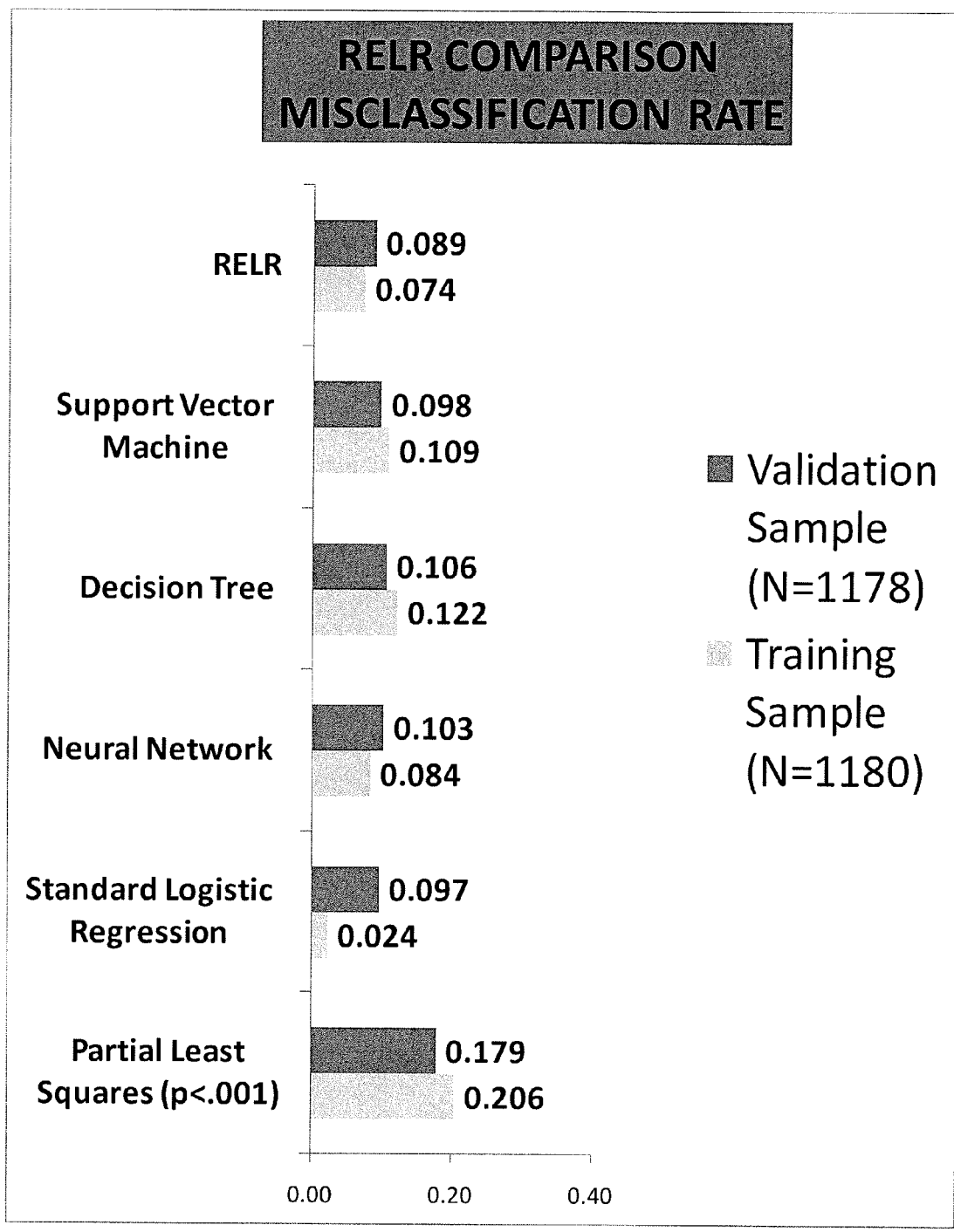

Figure 4: Comparison of PTEN Model.
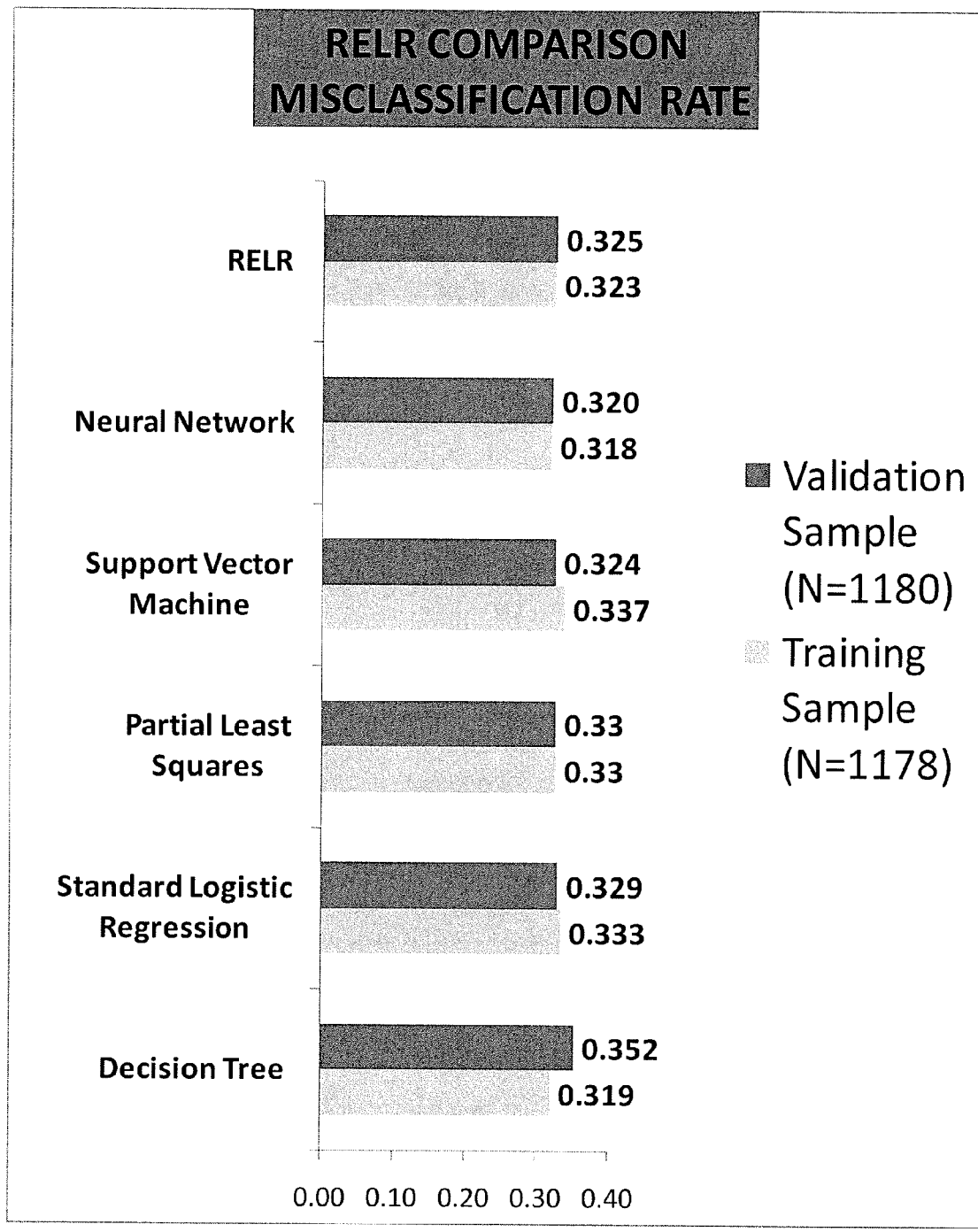

GENERALIZED REDUCED ERROR LOGISTIC REGRESSION METHOD

CROSS-REFERENCE TO RELATED APPLICATIONS

This application is a continuation-in-part of U.S. non-provisional application Ser. No. 11/904,542, filed on Sep. 27, 2007, and the non-provisional continuation-in-part application Ser. No. 12/119,172 filed on May 12, 2008.

STATEMENT REGARDING FEDERALLY SPONSORED RESEARCH

Not Applicable.

BACKGROUND OF THE INVENTION

This invention relates to a method of classification through machine learning methodology that improves upon previous endeavors employing logistic regression. Automated classifications systems are an integral part of the fields of data mining and machine learning. Since the pioneering work of Luce (1959), there has been widespread use of logistic regression as an analytical engine to make classifying decisions. Examples of its application include predicting the probability that a person will get cancer given a list of their environmental risk factors and genes, predicting the probability that a person will vote Republican, Democratic or Green given their demographic profile, and predicting the probability that a high school student will rank in the bottom third, the middle third, or the upper third of their class given their socioeconomic and demographic profile. Logistic Regression has potential application to any scientific, engineering, social, medical, or business classification problem where target variable values can be formalized as binary, nominal, rank-ordered, or interval-categorized outcomes. More generally, Logistic Regression is a machine learning method that can be programmed into computers, robots and artificial intelligence agents for the same types of applications as Neural Networks, Random Forests, Support Vector Machines and other such machine learning methods, many of which are the subject of issued U.S. patents. Logistic Regression is an important and widely used analytical method in today's economy. Unlike most other machine learning methods, Logistic Regression is not a "black box" method. Instead, Logistic Regression is a transparent method that does not require elaborate visualization methods to understand how the classification works.

Prior art forms of logistic regression, along with other machine classification methods, have significant limitations with regard to their ability to handle errors such as sampling errors in small training sample sizes, over fitting error, and multicollinearity error related to highly correlated input variables. Many prior art logistic regression methods also do not handle high dimensional problems having very large numbers of variables effectively.

The present machine learning method is fundamentally different from prior art methods such as the one described in U.S. Pat. No. 7,222,127 (the '127 patent). For example, the method of the present invention is based upon reduced error logistic regression that can be shown to yield less error in machine learning applications with large numbers of multicollinear variables and a small number of observations, and the method of the present invention employs backward selection in its variable selection processing. The backward selection in the method of the present invention is based upon the magnitude of t values; this backward selection process starts with a very large number of variables and eliminates the least important variables based upon the magnitude of the t values until the best model is discovered as defined through a log likelihood function based upon probability of error that results from reduced error logistic regression. In contrast, the '127 patent employs additive or forward selection in its variable selection and further employs an arbitrary cost function in its objective function that is fundamentally different from that obtained through appropriately scaled symmetrical error modeling in the reduced error logistic regression method.

The present disclosure is directed to improvements in a method for Generalized Reduced Error Logistic Regression which overcomes significant limitations in prior art logistic regression. This prior art includes work by Golan et al. (1996) and early theoretical work disclosed by the Applicant in 2005 and 2006 that preceded what is currently known as Reduced Error Logistic Regression (RELR). The method of the present invention is applicable to all current applications of logistic regression. The present method effectively deals with error and dimensionality problems in logistic regression, and therefore has significantly greater reliability and validity using smaller sample sizes and potentially very high dimensionality in numbers of input variables. These are major advantages over prior art logistic regression methods. In addition, this improved method has an effective variable selection method and scales the model with an appropriate scale factor $\Omega$ that adjusts for total variable importance across variables to calculate more reliable and valid logit coefficient parameters generally. The present Generalized RELR method was not obvious or even possible given the Golan et al. (1996) work and the prior art theoretical work of the Applicant disclosed in 2005 and 2006. For example, the Golan et al. (1996) work does not include t values as measures that are inversely related to expected extreme error. In addition, the Golan et al. (1996) work and all such related work also have the same machine learning deficiencies as the early prior art theoretical work disclosed by the Applicant in 2005 and 2006. Once again, this prior art work of the Applicant had significant limitations and problems including lack of appropriate scaling and lack of variable selection that rendered it useless as a generalized machine learning method.

The present method is a continuation-in-part of U.S. patent application Ser. No. 11/904,542 also titled Generalized Reduced Error Logistic Regression Method. The major changes from the method described in this previous Ser. No. 11/904,542 application are:

1. The present application clears up ambiguities and errors in some of the formulas presented in application Ser. No. 11/904,542.

2. application Ser. No. 11/904,542 employed a t-value that required categorizing interval-category and ordinal dependent variables into binary dependent variables. The method of the present invention now uses a slightly different t-value measure than defined in application Ser. No. 11/904,542 that appears appropriate for all types of target variables and can give greater accuracy with interval or ordinal target variables. This is defined through Equations (5a) and (5b) and the description that follows these equations. This present t-value is analogous to the t-value used to test whether a Pearson correlation across independent observations is significantly different from zero. It differs from the previous one-sample t-value only because of a slightly different denominator to reflect differing estimates of degrees of freedom. We have found no evidence that this slightly different denominator in this measure in comparison to the one-sample t-value used in Ser. No. 11/904,542 has an effect on the accuracy, reliability or validity of models that do not have interval-category or ordinal dependent variables with the sample sizes that we typically employ with at least 40-50 target observations.

3. In contrast to the t-value formula in Ser. No. 11/904,542, the current t-value formula is affected by the number of independent observations. This differential treatment of completely independent vs. not completely independent observations in this current measure related to a t-value in Equations (5a) and (5b) was not adequately addressed in the Ser. No. 11/904,542 application, but is now handled with these changes.

4. The relative magnitude scaling factor $\Omega$ now is multiplied by 2 as shown in Equation (5b). This is because there are both positive and negative measures of expected error for each moment in the model. This doubling of the scale factor $\Omega$ reflects both positive and negative largest expected error measures proportional to the inverse of the t-value. The doubling of the scale makes mathematical sense because this is a relative magnitude scale, so it should be a sum of all t-values in the model, including those relating to both positive and negative expected error.

5. The method of the present invention now allows a user to control the speed of the variable selection phase through batch processing of the t-values. For models with very large numbers of observations and very large numbers of variables, this may yield an enormous savings in computational time, but will always give the exact same solutions as would be obtained without employing batch processing.

6. The method of the present invention now adds the ability to model patterns of missing vs. non-missing observations on input variables that have a structural relationship to the target variable.

7. The method of the present invention now allows for hierarchical rules for interactions to govern variable selection as is sometimes done in genomic models. This option is under user control, but is not arbitrary and is instead determined by unique features of an application.

8. The results chart now change slightly for RELR because of the use of appropriate McNemar statistics for dependent proportions and because of updated changes in software to reflect method changes. In addition, we found that we could get a better SVM model for the large sample political polling model (FIG. 3), so SVM fares better in these comparisons. Finally, in other comparative modeling approaches such as Neural Networks, we found that we were able to get slightly better models by changing certain parameters, so in these cases we report the best possible model for comparison. In other cases, the results change slightly as we discovered errors in our data processing. The results now clearly show that RELR specifically improves classification performance in a dataset with a relatively small sample size where sampling and multicollinearity error would be expected to be most pronounced as shown in FIG. 2.

9. Finally, the method of the present invention now specifies a measure of model performance that is used as a measure of the best model; such a measure was unspecified in the Ser. No. 11/904,542 application. This measure is the maximal Log Likelihood across the training observations. This measure of the best model is described through Equation (1a).

BRIEF SUMMARY OF THE INVENTION

Machine learning methods are typically applied to data sets to generate a classification model. The feed-forward network composed of input-decision-output nodes is basic to the simplest systems that exhibit classification learning, such as the Perceptron (Rosenblatt, 1958). The Perceptron can be conceptualized as a machine learning method with standard logistic regression as its computational engine. However, the Perceptron ultimately failed as a general machine learning method because it could not handle large dimensional problems that typically result from interactions between input variables and because it could not handle the multicollinearity error that typically results from large numbers of correlated variables with relatively small numbers of observations. By contrast, RELR is able to handle problems with very high dimensionality. In addition, RELR is able to reduce the multicollinearity error within this type of classification processing. Therefore, a significant advantage of the method of the present RELR method is how computations are made within this classification architecture, as these computations can lead to a significant reduction of error and increase in computational efficiency in machine learning processing of many correlated input variables and interactions.

The method of the present invention provides a very broad, new machine learning process. This RELR method works for those multicollinear and high dimensional problems where standard logistic regression does not. The RELR method also appears to work as well as standard logistic regression in low multicollinearity and low dimensional problems where standard logistic regression works quite well. RELR can be used with binary, nominal, rank-ordered, or interval-categorized target variables. Since continuous target variables always can be encoded as interval-categorized variables, it can be applied in practice to continuous variables after they are recoded. Input variables can be nominal, ordered, and/or continuous. Also, RELR works with input variables that are interactions to whatever order is specified in the model, although our typical application is to use three or fewer interaction levels. The process works with many input variables, and also allows modeling of non-linear effects in input variables up to a 4th order polynomial component. Optionally, users can decide to model only linear variables RELR handles the dimensionality problem relating to large numbers of variables by effectively selecting variables prior to building a model to include only the most important variables in the logistic regression model.

The data presented in this application suggest that RELR can have significantly less error than five standard machine learning methods in datasets involving small sample sizes and/or large numbers of informative, correlated variables. These comparison methods included Support Vector Machine, Neural Network, Decision Tree, Partial Least Squares, and Standard Forward-Select Logistic Regression.

BRIEF DESCRIPTION OF THE SEVERAL VIEWS OF THE DRAWINGS

FIG. 1 is a depiction of the feed forward network structure;

FIG. 2 is a chart that compares RELR misclassification error to that from five standard machine learning methods in models built from a dataset with a small sample of training observations and many correlated important variables;

FIG. 3 is a chart that compares RELR misclassification error to that from five standard machine learning methods in models built from a dataset with a larger sample of training observations and many correlated important variables;

FIG. 4 is a chart that compares RELR misclassification error to that from five standard machine learning methods in models built from a dataset with a larger sample of training observations and some correlated variables, but few important variables.

DESCRIPTION OF THE PREFERRED EMBODIMENT

Classification systems typically rely upon a feed-forward network that encompasses three types of nodes: input nodes, decision nodes, and output nodes. The input node is a vector of variables that are input variables; and there can be millions of such input variables in some high dimensional complex problems. The decision node is a vector of weights that are multiplied by the input vector to compute the probability or some other indicator of a given class membership. Finally, the output node is typically an on-off signal that conveys the classification decision as to whether or not membership in a given class exists. Such nodes may be connected in a simple feed-forward network as shown in FIG. 1.

Through repetitive exposure to classification membership in training, the decision node ultimately learns to weight the values of the input variables so as to compute the probability of a given class. In this way, such networks can store classification learning through these weightings. For example, in this FIG. 1 network, classification learning is computed by updating the weights $\beta(j,r)$ to produce classification decisions that attempt to closely match the history of classification observations given to this network in training. Such updates in storage weights $\beta(j,r)$ may be done by individual observation or by epochs of observations. In addition, prior to being exposed to classification observations, a network may have prior weightings $\beta(j,r)$ based upon Bayesian rules or other prior rules on the inputs, including uniform weightings across all inputs. This invention does not address the architecture of such a simple input-decision-output node feed-forward network, as such a network is basic to learning systems. An example of this type of input-decision-output structure is the neuron. In this case, graded potentials passed down dendrites form the inputs, the summation of these graded potentials in the axon hillock forms the decision probability for the threshold point, and the all-or-none neural impulse passed down the axon forms the output component.

One major point of novelty of the present invention is how the weights that form the basis of the decision in the decision node are computed. The computation that is necessary to form these weights takes place in a logistic regression based classification system that computes weights through the RELR method. It is assumed that RELR would be useful in generating these decision weights whether the network is a very simple and naïve feed-forward network such as in FIG. 1, or is a complicated feedback network composed of many sub-networks built from the FIG. 1 network.

One very simple physical implementation of the input-decision-output feed forward network would be to have the input node be a database that resides on a computer that runs as a database server and defines all relevant input variables for RELR. The decision node could reside within the same computer or on a separate computer and run the RELR method through appropriate software to calculate the weights. The output node could be an on-off switch that connects to a physical device such as an alarm that is turned on or off as a function of the probability results of RELR and the decision threshold. In this implementation, RELR could be trained to learn a classification of alarm vs. non-alarm states based upon the historical database of observations residing on a server.

As another example, the output node need not connect to an operational device but instead may connect to a computer terminal screen or printer. For example, the input node may be a database that contains enormous numbers of genetic variables, the decision node would be a programmed to run the RELR method and compute weights to predict disease classifications based upon the inputs, and the output node may be connected to a computer visual screen that informs a physician the diagnostic category that the RELR method gives to a given patient. In a similar fashion, the input node may be a marketing or financial database residing on a computer, the decision node would be programmed to run RELR to compute weights to predict whether a customer will purchase a product or whether a stock will go up or down, and the output node may display the results of RELR through a computer visual screen to an analyst or statistician. These are very typical medical and business analytics applications of machine learning.

As another example, RELR need not be implemented in software but instead may be implemented through a hardware chip. In this example, the input node may be a database of sensory variables that arise from a robot's interactions with its environment, the decision node may compute weights to classify these sensory input patterns into recognition memory patterns, and the output node may be connected to other such feed-forward networks that control the robot's limbs directly or through intermediary feed-forward networks that compute reinforcement or punishment classification decisions. In this example, there may be many such feed-forward networks arranged in parallel at each stage of processing and all such simple feed-forward networks would have weights computed with RELR. In addition, the output from some subset of these feed-forward networks may become feedback inputs to earlier points in a larger network.

Thus, RELR may be used in a very general way to compute classification weights across all possible network configurations built from this simple feed-forward network. It would apply to the simple uses of machine learning as when an analyst is using a database to generate a predictive model in a business application to make a business decision. It would also apply to the most complicated applications involving robotic learning where a very large number of such feed-forward networks may work together through feedback. Because RELR may be applied to produce weights for any and all such classification learning paradigms involving this simple feed-forward network, RELR is a generalized machine learning method.

A network is trained to make a decision by repeatedly observing associations between input variables and class membership. These values of the classification membership across observations are typically binary representations of different class levels of a variable known as the target variable. In logistic regression, probabilities are computed that measure this association between a set of input variable values and each level of the target variable. In logistic regression, the decision rule that determines whether the weights that are the basis of this probability are greater than a threshold can be expressed in terms of the simple linear summation rule shown in FIG. 1. The weights that are the basis of this probability are the essence of what is learned; there is a weight for each input variable. RELR's approach to computing these weights differs from existing logistic regression methods in that it employs an approach designed to reduce the error in these weights with many potentially correlated inputs. The output or decision of the model is based upon threshold rules that determine the class that a given probability indicates. Once RELR has computed weights, observations can be automatically scored through the prior art formula depicted in FIG. 1 to yield most likely class membership based upon given thresholds. Once again, a major novelty to RELR does not concern the physical architecture depicted in FIG. 1, as this architecture is basic to Perceptron-type classification learning systems. Instead, this novelty is in how the weights that are employed in FIG. 1 are computed, as relatively reduced error weights involving large numbers of potentially correlated input variables can be generally computed with RELR. These novel features involve a detailed methodology and this method is described below.

The present Generalized RELR method is based upon the Golan et al. (1996) maximum entropy subject to linear constraints formulation that was shown to be equivalent to the McFadden (1974) maximum likelihood logit formulation with the additions that Golan et al. (1996) further developed to model error probabilities. The major present additions to this prior art are extensions to handle nonlinear variables, interaction variables, symmetrical extreme error probabilities with correct scaling, ordinal target variables, non-independent observations, and variable selection, as all of these extensions are necessary for a generalized machine learning method. In this formulation, we seek the maximum of the entropy function H(p,w):

$$H(p, w) = -\sum_{i=1}^{N}\sum_{j=1}^{C} p_{ij}\ln(p_{ij}) - \sum_{l=1}^{2}\sum_{r=1}^{M}\sum_{j=1}^{C} w_{ljr}\ln(w_{lji}) \quad (1)$$

subject to constraints that include:

$$\sum_{i=1}^{N}\sum_{j=1}^{C} (x_{ijr}y_{ij}) = \sum_{i=1}^{N}\left[\sum_{j=1}^{C}(x_{ijr}p_{ij}) + (u_r w_{1jr} - u_r w_{2jr})\right] \quad (2)$$

for r=1 to M.

$$\sum_{j=1}^{C} p_{ij} = 1 \text{ for } i = 1 \text{ to } N \quad (3)$$

$$\sum_{j=1}^{C} w_{jlr} = 1 \text{ for } l = 1 \text{ to } 2 \text{ and } r = 1 \text{ to } M \quad (4)$$

$$\sum_{i=1}^{N} y_{ij} = \sum_{i=1}^{N} p_{ij} \text{ for } j = 1 \text{ to } C-1, \quad (5)$$

where C is the number of choice alternatives, N is the number of observations and M is the number of data moment constraints.

In this formulation, $y_{ij}=1$ if the ith individual chooses the jth alternative from the choice set and 0 otherwise. Also, $x_{ijr}$ is the rth characteristic or attribute associated with the ith individual who perceives the jth choice alternative, so $x_{ij}$ is a vector of attributes specific to the jth alternative as perceived by the ith individual and $x_i$ is a vector of characteristics of the ith individual. In addition to representing non-interactive features of the individual or the choice, an individual $x_r$ vector also may represent an interaction where each interaction vector is formed in the usual way as a product of characteristics and/or attributes. The $p_{ij}$ term represents the probability that the ith individual chooses the jth alternative and $w_{jlr}$ represents the probability of error across individuals corresponding to the jth alternative and rth moment and lth sign condition. When l=1, $w_{jlr}$ represents the probability of positive error. When l=2, $w_{jlr}$ represents the probability of negative error.

Clean version

The $u_r$ term is a measure of the largest expected error for the rth moment. The fact that the error term is the "largest expected error" is consistent with the Extreme Value Type I properties of the Logit error. It is defined as:

$$u_r = \Omega/(((r_r\sqrt{N_r-2})/\sqrt{1-r_r^2})\text{sqrt}((N_{r'}-2)/(N_r-2))) \text{ for } r=1 \text{ to } M,$$

where Ω is defined as:

$$\Omega = 2\sum_{r=1}^{M} |r_r|\sqrt{N_r - 2} \Big/ \sqrt{1 - r_r^2}\, sqrt((N_{r'} - 2)/(N_r - 2)) \quad (5b)$$

for $r = 1$ to $M$, where $N_r>2$ and where $r_r>-1$ and $r_r<1$ and $r_r\neq 0$.

The denominator in Equation (5a) is analogous to a t-value that arises from the standard t-test that is performed to determine whether a correlation is significantly different from zero. When this t-value is small, then this extreme error value estimate defined by $u_r$ is large. When this t-value is relatively large, then this $u_r$ extreme error value estimate is relatively small. $N_r$ reflects the number of non-missing observations across all $x_{ir}$, i=1 to N observations whether or not these are independent observations, whereas $N_{r'}$ is a count of the number of such non-missing independent observations for each of the r=1 to M moments. Unless the observational training design is a repeated measures or multi-level design or a similar design that involves non-independent measures (see below), then $N_r=N_{r'}$. In these equations, $r_r$ is analogous to the Pearson Product Moment Correlation between the $N_r$ non-missing values of the rth moment and the corresponding binary coded representation of reference vs. non-reference membership of the target variable, where this binary representation is 1 if the class is the reference class and 0 otherwise. Ω is a positively valued scale factor that is the sum of the magnitude of the denominator of Equation (5a) across all r moments. If we take the magnitude of each $t_r$ to reflect the extent to which the rth moment is informative, then the sum of these magnitudes across all r moments to define Ω in Equation (5b) reflects the extent to which all moments are informative. This sum is multiplied by 2 because there are two t-values with identical magnitudes but opposite signs proportional to the inverse of positive and negative expected extreme error for each moment. Note that we are not using t-values in a true inferential manner in the RELR formulation, but are instead using them as an estimate that is inversely proportional to the largest expected extreme error value corresponding to each input moment.

Clean version

The constraints given as Equation (5) are intercept constraints and they can determine the threshold level for the output decisions. These intercept constraints are presented for sake of generality, but in balanced sample RELR applications these constraints are often dropped from the model. This is because RELR does not attempt to reduce error in intercept weights, as unlike the input moment constraints, there are no error probability terms $w_{jlr}$ corresponding to these intercept moments, so the inclusion of such intercept constraints tends to increase multicollinearity error. For example, in applications involving binary or nominal target variables, these constraints may be dropped from the model and instead we use an alternative manner to arrive at the threshold level for output decisions. As examples of alternatives, the threshold level for each class may be determined based upon probability thresholds that yield minimal expected response bias, or such threshold levels may be determined by the user based upon the relative cost of a wrong decision in one class or another.

In many RELR applications in the case of a nominal target with more than two alternatives C, it is useful to choose the reference choice condition j=C to reflect the category with the largest number of responses. This ensures that the t-value described above is the most stable possible value. The reference choice does not matter with only two alternatives.

The first M/2 set of data moments in Equation (2) are from r=1 to M/2 and reflect the most important linear or cubic components as defined below through variable selection. The second M/2 set of data moments are from r=M/2+1 to M and reflect the most important quadratic or quartic components as defined below through variable selection. Nominal input variables are recoded into binary variables for each category condition to be accepted as inputs within this structure. In addition, input variables that are perfectly correlated with a previously admitted input variable are not allowed as input variables. Input variables with zero correlation to the target variable are also not allowed as input variables.

1) linear constraints: The linear constraints are formed from the original input variables. These constraints are standardized so that each vector $x_r$ has a mean of 0 and a standard deviation of 1 across all C choice conditions and N observations that gave appropriate non-missing data. When missing data are present, imputation is performed after this standardization by setting all missing data to 0. Interaction input variables are formed by multiplying these standardized variables together to produce the desired interactions. When such interactions are formed, the vector $x_r$ corresponding to each resulting interaction variable is also standardized and imputed in the same way. Finally, in order to model missing vs. non-missing patterns of observations in input variables that are correlated to the target variable, new input variables are also formed that are dummy coded to reflect whether observations were missing or not for each previously defined linear component. Through these missing code variables, structural relationships between missing data and the target variable can also be modeled for each of the components. These missing code variables are also standardized to a mean of 0 and a standard deviation of 1.

2) cubic constraints: These constraints are formed by cubing each standardized vector $x_r$ from constraint set 1 with the exception of the missing code variables. If the original input variable that formed the linear variable was a binary variable, these components will not be independent from linear components and are dropped. When missing data are present, imputation is performed as in Constraint Set 1.

3) quadratic constraints: These constraints are formed by squaring each of the standardized vectors from constraint set 1 with the exception of the missing code variables. If the original input variable that formed the linear variable was a binary variable, these components will not be independent from linear components and are dropped. When missing data are present, imputation is performed as in Constraint Set 1.

4) quartic constraints: These constraints are formed by taking each of the standardized vectors from constraint set 1 to the $4^{th}$ power with the exception of the missing code variables. If the original input variable that formed the linear variable was a binary variable, these components will not be independent from linear components and are dropped. When missing data are present, imputation is performed as in Constraint Set 1.

With these moment definitions, two additional sets of linear constraints are now imposed in this maximum entropy formulation above. These are constraints on w:

$$\sum_{j=1}^{C}\left[\sum_{r=1}^{M} s_r w_{j1r} - \sum_{r=1}^{M} s_r w_{j2r}\right] = 0 \quad (6)$$

$$\sum_{j=1}^{C}\left[\sum_{r=1}^{M} w_{j1r} - \sum_{r=1}^{M} w_{j2r}\right] = 0 \quad (7)$$

where $s_r$ is equal to 1 for the linear and cubic group of data constraints and −1 for the quadratic and quartic group of data constraints. Equation (6) forces the sum of the probabilities of error across the linear and cubic components to equal the sum of the probabilities of error across all the quadratic and quartic components. Equation (6) groups together the linear and cubic constraints that tend to correlate and matches them to quadratic and quartic components in likelihood of error. Equation (6) is akin to assuming that there is no inherent bias in the likelihood of error in the linear and cubic components vs. the quadratic and quartic components. Equation (7) forces the sum of the probabilities of positive error across all M moments to equal the sum of the probabilities of negative error across these same moments.

The probability components in the solutions have the form:

$$p_{ij} = \exp\left(\beta_{j0} + \sum_{r=1}^{M} \beta_{jr} x_{ijr}\right) \bigg/ \left(1 + \sum_{j=1}^{C-1} \exp\left(\beta_{j0} + \sum_{r=1}^{M} \beta_{jr} x_{ijr}\right)\right) \quad 8)$$

$$w_{j1r} = \exp(\beta_{jr} u_r + \lambda_j + \tau_j) \bigg/ \left(1 + \sum_{j=1}^{C-1} \exp(\beta_{jr} u_r + \lambda_j + s_r \tau_j)\right) \quad 9)$$

$$w_{j2r} = \exp(-\beta_{jr} u_r - \lambda_j - \tau_j) + \left(1 + \sum_{j=1}^{C-1} \exp(-\beta_{jr} u_r - \lambda_j - s_r \tau_j)\right) \quad 10)$$

However, for the reference condition where j=C, the solutions have the normalization conditions described by Golan et al. (1996) where the vectors $\beta_c$ and $\lambda_c$ and $\tau_c$ are zero for all elements r=1 to M. Hence, the solution at j=C takes the form:

$$p_{ij} = 1 \bigg/ \left(1 + \sum_{j=1}^{C-1} \exp\left(\left(\beta_{j0} + \sum_{r=1}^{M} \beta_{jr} x_{ijr}\right)\right)\right) \quad 11)$$

$$w_{j1r} = 1 \bigg/ \left(1 + \sum_{j=1}^{C-1} \exp(\beta_{jr} u_r + \lambda_j + s_r \tau_j)\right) \quad 12)$$

$$w_{j2r} = 1 \bigg/ \left(1 + \sum_{j=1}^{C-1} \exp(-\beta_{jr} u_r - \lambda_j - s_r \tau_j)\right) \quad 13)$$

where $\lambda$ and $\tau$ are vectors of the solution parameters related to the two symmetrical sample error constraints across the C-1 choice conditions (Equations 6 and 7). In addition, $\beta$ is a matrix of solution parameters related to the data moment constraints (Equation 2).

The multinomial logistic regression method that is outlined in the previous sections can be extended to situations where the target variable is a rank or interval-categorized variable with more than two categories, rather than a binary or nominal variable. This extension is exactly as in standard maximum likelihood logistic regression. As in standard ordinal logistic regression or what is called cumulative logit in SAS (see SAS 9.1.3 manual), an assumption is made that there is a linear relationship between the log odds of having a higher ordered category and the ordered values of the ordinal or interval target variable. As a result, there is only one logit coefficient for each of the r variables $\beta_r$, without regard to the number of ordinal categories. However, the number of potential intercept coefficients will continue to be C-1, as in the non-ordinal category model (Equation 5). Just as it is useful to drop intercept coefficients in binary and nominal RELR, it is useful to drop the j=1 intercept from the RELR ordinal model to reduce multicollinearity error. In this case of ordinal regression, we no longer use a binary representation of the target variable to produce the correlations $r_r$ referenced in Equations (5a) and (5b), but instead we use the direct correlation between the levels of the input variable and the levels of the target variable to produce this correlation.

This method can be extended to situations where training observations are made in repeated measures or multilevel designs. That is, the meaning of the index i that designated "individuals" in the multinomial discrete choice formulation of Equation (2) can now be expanded to represent "individual measurements". These "individual measurements" can be from the same individual at different points in time as in a repeated measures variable such as multiple items in a survey or experiment, or from different individuals within a multilevel variable such as a county or a state. Depending upon how each of the r moments are constructed, individual-level and aggregate-level moments can be formed to result in a repeated measure and/or a multi-level design. In contrast to non-repeated/multilevel designs, the critical distinction in repeated measures/multilevel designs is that the values of all input variables are no longer independent across all observations. For example, if a group of individuals is measured in a choice preference task over time, the number of independent observations of the height of each individual is not equal to the total number of observations in this repeated measures task, but is instead equal to the number of individuals in the group. Hence, one has to consider differently how many independent observations one has for each variable in a repeated measures model. Likewise, the number of independent observations of states in a multilevel model involving individual cities within states will not be the same as the number of cities observed. Hence, the application to repeated measures/multilevel observational designs is very straightforward once one has an appropriate way to deal with non-independent observations of input variables through the appropriate adjustment in the expected error term related to the number of independent observations $N_r$ in Equations (5a) and (5b).

As shown by Golan et al. (1996), the multinomial discrete choice model formulation based upon maximizing entropy is equivalent to the standard maximum likelihood discrete choice model. Hence, in actual practice, one can maximize entropy in the objective function or one can maximize the appropriate unconstrained log likelihood function that is the basis of maximum likelihood. This log likelihood function is:

$$LL(p, w) = \sum_{i=1}^{N}\sum_{j=1}^{C} y_{ij}\ln(p_{ij}) + \sum_{l=1}^{2}\sum_{r=1}^{M}\sum_{j=1}^{C} y_{jlr}\ln(w_{jlr}) \qquad (1a)$$

where the indices and parameters are defined as previously noted. The left hand summation set in Equation (1a) involving p is the standard log likelihood function in logit regression; the right hand summation involving w is introduced to model error probabilities in analogy with Golan et al. (1996) as was done in the maximum entropy formulation's Equation (1). Note that the values of $y_{jlr}$ that are multiplied by $\ln(w_{jlr})$ are set to equal 1 if the jth condition is the reference condition and 0 otherwise. Hence, these values in the model dataset are pseudo-observations as they do not reflect real observations but instead reflect terms that model error.

Therefore, given the equivalence between the maximum entropy and maximum likelihood solutions, whether the objective is to maximize entropy subject to linear constraints as in Equations (1-5), or to maximize an unconstrained log likelihood function as in Equation (1a), has no bearing on these reduced error solutions for a given variable set, as these are equivalent ways to achieve the same solution. The advantage of discussing RELR in terms of a maximum entropy subject to linear constraints model is that it gives a somewhat simpler and easier to present formulation. Yet, the maximal log likelihood computation is considerably faster and we expect that this will be generally the case. For this reason, we prefer to maximize log likelihood in our implementation of RELR and we will refer to this throughout the rest of this application.

The purpose of variable selection is to reduce the dimensionality of the problem into a manageable number of variables. The basic idea is to capture the subset of most important variables that would have the largest magnitude logit coefficients in a full model, while excluding those variables with smaller magnitude logit coefficients. In this way, we can build a model with a much smaller set of variables than with the entire set. This variable selection process arises from a set of relationships in the preceding equations. For example, from Equations (9), (10), (12) and (13) and properties of the natural log, and if we assume that we have all independent observations such that $N_r/N_r=1$, we have:

$$\ln(w_{j1r}/w_{j2r})-\ln(w_{c1r}/w_{c2r})=2\beta_{jr}u_r+2\lambda_j+2s_rT_j \qquad 14)$$

Hence, we can consider the right hand side of Equation (14) to be the error for the rth moment and jth choice condition that is described in this reduced error model and write $u_r$ in terms of $\Omega/t_r$:

$$\epsilon_{jr}=2\beta_{jr}\Omega/t_r+2\lambda_j+2s_rT_j \qquad 15)$$

There is a basic relationship between $t_r$ and the logit coefficient $\beta_{jr}$ that follows algebraically simply by rearranging Equation (15):

$$(t_r/\Omega)(\epsilon_{jr}/2-\lambda_j-s_rT_j)=\beta_{jr} \qquad 16)$$

Therefore, we know that the following relationship will hold where $\epsilon_{jr}$ has been set to a value that is approximately zero:

$$(t_r)(-\lambda_j-S_rT_j)/\Omega \approx \beta_{jr} \qquad 17)$$

so we can assume that the expected value of each logit coefficient $\beta_{jr}$ is approximately proportional to $t_r$ when $\epsilon_{jr}$ is approximately zero. We also know that the expression $-\lambda_j-S_rT_j$ corresponding to all linear and cubic variables will be equal and that corresponding to all quadratic and cubic variables will be equal for each of the jth choice conditions. This simply follows from the definitions of these various variables. Therefore, we can use this relationship to select the linear and cubic moments with the largest expected logit coefficient magnitudes for each of the jth choice conditions simply in terms of the magnitude of $t_r$. Likewise, we can select the largest expected logit coefficient magnitudes for all quadratic and quartic moments simply in terms of this same magnitude. In the special case of a model where a user has requested only linear moments, we can use this same relationship to order the magnitude of these logit coefficients. Once again, this assumes that the expectation that $\epsilon_{jr}$ is approximately zero is a good approximation to the actual estimated value of $\epsilon_{jr}$ across all j and r conditions.

In fact, we expect that this relationship in Equation (17) which assumes that $\epsilon_{jr}$ is approximately zero to be a very good approximation when $\Omega$ gets large in comparison to the magnitude of $t_r$. This is due to the linear relationship in Equation (2) which suggests that if we substitute $u_r = \Omega/t_r$, then as $\Omega$ gets larger in comparison to the magnitude of $t_r$, $w_{j1r}$ and $w_{j2r}$ must become closer to being equal, so that at very large values of $\Omega/|t_r|$ they are substantially equal. However, this relationship in Equation (17) could be a poor approximation for models with a few variables with relatively large magnitude t-values that have small values of the ratio $\Omega/|t_r|$, as in this case the error $\epsilon_{jr}$ is not necessarily close to zero. However, in such models, the most important variables with the strongest relationship to the target variable are not an issue as these are the few variables with very large relative t-value magnitudes. Therefore, in general, we use the magnitude of $t_r$ to select the variables with the largest expected logit coefficient magnitudes whether or not the actual estimated error $\epsilon_{jr}$ turns out to be close to zero.

To summarize, we select variables for all models using rank ordering based upon the magnitude of $t_r$ with the caveat that the $t_r$ values are weighted $t_r$ values when $N_{jr} \neq N_r$, when this weighting would be in line with the weighting of $t_r$ as in Equation (5a) and (5b). That is, a weight of sqrt$((N_r-2)/(N_r-2))$ would be used as in Equation (5a) and (5b).

Hence, we can write the following set of steps to define our variable selection method:

1. start with the M/2 most important odd numbered polynomial variables and M/2 most important even numbered polynomial variables as defined by the magnitude of the weighted t-value that reflects the strength of their relationship to the target variable;

2. build a RELR model with these variables through the formulation described in this application and record its performance criterion value;

3. drop the odd numbered polynomial variable and even numbered polynomial variable with the smallest t-value magnitudes and drop the pseudo-observations corresponding to these variables that reflect their positive and negative error probabilities. Remember to update the relative magnitude scale $\Omega$ to reflect only those variables that remain in the model at each step;

4. repeat steps 2-4 until we have dropped all relevant variables given the performance criterion for the best model;

5. of all the models across the variable sets, take the model that optimizes the performance criterion as the best model. The optimal performance criterion is defined to be the model that has the largest Log Likelihood across the training observations, where the Log Likelihood across the training observations is defined through the summation across i=1 to N in Equation (1a). In the case of tie in this performance criterion between two or more candidate models, we take the model with the smallest number of variables as the best model.

Hence, we can start with a subset of all possible variables as defined by our initial assessment of the rank order of weighted t-value magnitudes corresponding to each possible variable, build a model, and gradually drop variables and corresponding pseudo-observations to create successively smaller models. We do this by dropping variables and pseudo-observations corresponding to the least important odd and even numbered polynomial components at each step in the variable screening process, rebuild the model, and then check the performance criterion. We define the importance of the variables through the magnitude of weighted t-values. At the end of this screening process, we want the variable set with the optimal value of the performance criterion.

Note that the computation of the t-value magnitudes for all initial input variables and interactions that are screened for variable selection may be made more efficient by grouping the variables that comprise these t-values into smaller sets and computing the t-values in smaller serial batches or in parallel. Hence, the method of the present invention allows all original input variables and their interactions to be broken into a set of smaller manageable batches for t-value computations, where a user may define the number of batches that are associated with relatively fast processing times given their hardware environment and the size of their problem.

Hierarchical relationships between input variables and their interactions are often assumed in some types of applications such as genomic applications (Park & Hastie, 2006). For example, in some genomic models, the hierarchical relationship does not allow an interaction to be selected in a model without all variables that compose the interaction also being selected. In addition, these genomic models have not allowed any variables other than linear variables to be entered into a model. The method of the present application allows for such hierarchical rules for variable selection. In particular, if a user so chooses, each variable set selected can be constrained so that interactions terms are only allowed when all constituent variables are also present. The effect of this is that multiple variables may be dropped at each step in the variable selection process because if a constituent variable is dropped, then all of its interaction terms are also dropped. The method of the present invention can do this through its variable selection process, as long as entirely linear variables are employed. Users may have control over whether or not to exercise this option.

What follows are examples of the use of the method of the invention.

The solutions that are reported here used Proc Genmod in SAS although RELR can be implemented in any computer process that maximizes entropy/likelihood whether it is a software language or a computer hardware process. The comparison methods were evaluated using SAS Enterprise Miner. These comparisons do not reflect comprehensive benchmarking studies, but are used in this application to support the claim that RELR can have significantly better classification learning performance with smaller sample sizes and multi-collinear variables.

Data were obtained from the Pew Research Center's 2004 Election Weekend survey. The survey consisted of a representative sample of US households. Respondents were asked about their voting preference on the weekend before the 2004 election. 2358 respondents met the criteria of this example model which only employed those respondents who indicated that they would vote for Bush or Kerry without regard to whether Nader was in the race. In addition to voting patterns, this survey collected demographic and attitude data. These demographic and attitude responses were employed as input variables in the predictive models. Examples of attitude questions were whether respondents agreed with the Iraq war and whether respondents thought that the US was winning the war against terrorism.

In a first "smaller sample" model, the training sample consisted of a segmented sample of 8% or 188 observations. The remainder of the overall sample defined the validation sample. In a second "larger sample" model, the training sample consisted of a segmented sample of roughly 50% or 1180; the remainder of this sample defined the validation sample. This segmented sampling method is the default sampling method in the SAS Enterprise Miner 5.2 that was also used to build the models. The target variable was Presidential Election Choice (Bush vs. Kerry). Kerry was the target condition. The 2004 election was very close, as roughly 50% of the respondents opted for Kerry in all of these sub-samples. Target condition response numbers are indicated in the results charts.

There were 11 interval variables and 44 nominal input variables originally, but the nominal variables were recoded into binary variables for input into RELR. RELR also produced new input variables from these original input variables corresponding to two-way interactions, polynomial terms, and missing data where appropriate as described earlier in this application. Over 2500 variables resulted in total. Variables were then selected and deleted in accordance with the RELR variable selection and deletion methodology that has been previously outlined. The 46 most important linear/cubic variables and 46 most important quadratic/quartic variables were selected in the "smaller sample model" as the starting point for the reduced error logistic regression backward selection using the magnitude of their t values as a measure of expected importance. The 100 most important linear/cubic variables and 100 most important quadratic/quartic variables were selected in the "larger sample model" as this same starting point. Our experience to date is that error may be reduced when a larger number of variables is used as this starting point but this error reduction does not seem to be significant when more than roughly 200 total variables are used. However, over fitting can also occur if this starting number of variables is larger than the number of observations in the smallest category of the target variable, so this is why only 92 variables were used as the starting number of variables in the smaller sample model. The models were run within SAS Enterprise Miner 5.2 using the extension node methodology.

Bush vs. Kerry models were also run within Enterprise Miner 5.2 using the Support Vector Machine, Partial Least Squares, Decision Tree, Standard Logistic Regression Stepwise Selection and Neural Network methods. The default conditions were employed in all cases except Standard Logistic Regression where two way interactions and polynomial terms up to the $3^{rd}$ degree were specified and Support Vector Machines where the polynomial kernel function was requested. Also, Stepwise Selection was performed with the Logistic Regression in the Pew "smaller sample", but no selection was performed with the larger sample due to the long time that it took to run the stepwise process in this sample. In addition, the Imputation Node within Enterprise Miner was employed with the Regression and Neural Network methods and was run using its default parameters. The identical variables and samples were employed as inputs in all cases. Misclassification Rate was employed as the measure of accuracy in all cases.

Like most political polling datasets, there was a wide range in the correlation between the original input variables that went from roughly −0.6 to about 0.81. These correlation magnitudes were even larger for many of the interactions produced by RELR being over 0.9 in many cases, so this dataset clearly exhibited multicollinearity. In addition, there was significant correlation to the target variable in a number of variables. The largest correlations to the target variable were in the 0.7-0.8 range. Hence, this dataset contained a number of fairly informative variables that were well correlated to the target variable.

FIG. 2 compares the rate of RELR to the other predictive modeling methods in the Pew "smaller sample" model. The significance levels in that figure are from chi-square tests that compare these misclassification proportions using McNemar's test for dependent proportions in the validation sample. FIG. 3 shows these same comparisons for the Pew "larger sample" model. These results suggest that RELR had better validation sample classification accuracy than a set of commonly used predictive modeling methods that include Standard Logistic Regression, Support Vector Machines, Decision Trees, Neural Networks, and Partial Least Squares, but that these effects are most pronounced with the smaller sample size of training observations. These results suggest that RELR's advantageous effects become most pronounced as more error is present as in the case with a smaller sample size of observations. Note that these samples were from a measure that had approximately half Bush and half Kerry responses, so there was very little bias in this target variable. This was reflected in the RELR models which also did not show strong bias in misclassification errors due to misses and false alarms.

Stock price data from Patterson Energy (NASDAQ symbol: PTEN) from Aug. 11, 1997-Aug. 8, 2006 were collected through the Reuter's Bridge Workstation QuoteCenter Product. Six variables that reflected the very short term price trend of PTEN were employed. They measured the % change between its opening price and recent other price points such as previous open price, its previous close price, and its previous high. From these six interval variables, 130 other variables were computed based upon up to 3 way interactions and $4^{th}$ order polynomials. Variables were then selected and deleted in accordance with the RELR variable selection and deletion methodology that has been previously outlined. The 92 most important variables were used as the starting point for the reduced error logistic regression, as a larger number had no effect on RELR performance. The target variable was based upon the % change in PTEN's price from one day's opening to the next day's opening. This variable was encoded into a binary target variable that reflected whether the stock price went up or down. An interval target variable would have also been appropriate. We found similar results when we used the Ordinal Logit formulation of Generalized RELR on interval-categorized encoding, but we wanted to use a binary target variable so we could continue to use Misclassification Rate to compare to other predictive modeling methods within SAS Enterprise Miner. The same comparison methods that were employed for the Pew "larger sample" model were employed in this case. All models were computed within Enterprise Miner.

There was a fair degree of correlation between some input or interaction variables that ranged as high as 0.9 in magnitude. However, these input and interaction variables were not highly correlated to stock price % change and its binary transform; the highest magnitude correlations were in the range of 0.16-0.20. Thus, these input and interaction variables might be classified as relatively non-informative variables that exhibited some degree of multicollinearity.

FIG. 4 compares the misclassification performance of RELR to the other predictive modeling methods in this PTEN model. There were no statistically significant differences between these methods with regard to classification error.

These results suggest that RELR does not appear to be associated with improved classification performance with multicollinear datasets having larger sample sizes, such as the Pew "larger sample" dataset or the PTEN dataset. However, RELR can be associated with significantly improved classification performance in a multicollinear dataset with a relatively small sample size such as with the "smaller sample" Pew comparison in FIG. 2. These results are consistent with our claim that RELR can improve classification performance in multicollinear datasets with relatively small sample sizes.

In view of the above, it will be seen that the advantages of the invention are achieved and other advantageous results obtained.

REFERENCES

Golan, A., Judge, G., and Miller, D. (1996), A maximum entropy approach to recovering information from multinomial response data. *Journal of the American Statistical Association*, 91: 841-853.

Luce, R.D. and Suppes, P. (1965). Preference, utility and subjective probability, in R.D. Luce, R.R. Bush and E. Galanter (eds), Handbook of Mathematical Psychology, Vol. 3, John Wiley and Sons, New York, N.Y., pp. 249-410.

Luce, R.D. (1959). Individual Choice Behavior: A Theoretical Analysis. New York: Wiley. McFadden, D. (1974). Conditional Logit Analysis of Qualitative Choice Behavior. In P. Zarembka (ed) Frontiers in Econometrics, New York, Academic Press, pp. 105-142.

McFadden, D. (2002). Logit. Online book chapter: http://elsa.berkeley.edu/choice2/ch3.pdf.

Peduzzi, P., J. Concato, E. Kemper, T. R. Holford, and A. Feinstein (1996). A simulation of the number of events per variable in logistic regression analysis. Journal of Clinical Epidemiology 99: 1373-1379.

Park, M.Y. and Hastie, T. (2008). Penalized logistic regression for detecting gene interactions. Online manuscript: http://citeseer.comp.nus.edu.sg/cache/papers/cs2/525/http:zSzzSzwww-stat.stanford.eduzSz~hastiezSzPaperszSzplr$_{13}$interactions.pdf/penalized-logistic-regression-for.pdf Rice, D.M. (2005). A new distribution-free hierarchical Bayes approach to Logit Regression. In Proceedings of the 70th Annual Psychometric Society Meeting in Tilburg, Netherlands.

Rice, D.M. (2006a). Logit regression with a very small sample size and a very large number of correlated input variables. In Proceedings of the 71st Annual Psychometric Society Meeting in Montreal, Quebec.

Rice, D.M. (2006b). A solution to multicollinearity in Logit Regression. Public domain manuscript distributed to attendees of the 2006 Psychometric Society Meeting.

Rice, D.M. (2007). An overview of reduced error logistic regression. Invited presentation at the SAS M2007 Conference at Caesar's Palace in Las Vegas, Nev.

Rosenblatt, F. (1958), The Perceptron: A Probabilistic Model for Information Storage and Organization in the Brain, Cornell Aeronautical Laboratory, Psychological Review, v65, No. 6, pp. 386-408.

The invention claimed is:

1. A system for machine learning comprising:
a computer including a computer-readable medium having software stored thereon that, when executed by said computer, performs a method comprising the steps of being trained to learn a logistic regression match to a target class variable so to exhibit classification learning by which:
an estimated error in each variable's moment in the logistic regression be modeled and reduced through constraints that require that the expected extreme error be inversely related to a t-value for that variable;
an estimated error in each variable's moment in the logistic regression be modeled and reduced through constraints that require that the probability of positive and negative estimated errors be substantially equal across all variable moments;
where there is substantially no bias in the probability of positive or negative estimated errors across even versus odd polynomial moments; and,
an estimated error in each variable's moment in the logistic regression is constrained by a scaling that is not the sum of t-values across all variables but instead is substantially twice that sum so to reflect both positive and negative expected errors whereby when this substantially twice sum value is divided by the t-value for any variable, it yields a large expected error for small t-values and a small expected error for large t-values.

2. The system of claim 1 wherein said method initially employs one or a plurality of standardized input variables.

3. The system of claim 2 wherein said method further employs standardized variables resulting from interactions between the input variables.

4. The system of claim 3 wherein said method further employs standardized variables that are nonlinear effects based upon the input variables or their interactions.

5. The system of claim 4 wherein said method computes a probability of a category and a category classification decision based upon a threshold.

6. The system of claim 5 wherein said method computes t-values using serial or parallel batch processing so to achieve a relatively fast processing speed.

7. The system of claim 6 wherein said method employs approximations of t-values that are computed so any expected error and accuracy is approximately the same as would result from using the t-values for which they are substituted.

8. The system of claim 7 further including dummy coded missing status variables and imputation of missing values through mean value imputation after the t-values, or any substitute approximations of t-values, have been computed.

9. The system of claim 8 wherein said method employs prior weightings of regression beta coefficients used to determine prior and posterior class probabilities.

10. The system of claim 9 wherein said method includes:
the dimensionality being initially reduced to a manageable size by selecting that subset of potential variables as inputs to the logistic regression which have the largest magnitude t-values or approximate substitutes to t-values, whereby odd and even polynomial variables are screened separately, if they exist, so that the inputs contain the group of odd polynomial variables with the largest magnitude t-values and the group of even polynomial variables with the largest magnitude t-values.

11. The system of claim 10 wherein said method includes:
performing successive iterations of the variable selection, performing of the method beginning with the initial manageable set of variables which are further gradually reduced by deleting variables with the lowest magnitude t-values or approximate substitutes to t-values;
which, if nonlinear variables are included, treats linear and odd polynomial variables and even polynomial variables as two separate groups in which variables are simultaneously dropped, if they exist, so to reach a best model which is defined as having the largest log likelihood across training observations.

12. The system of claim 4 wherein said method is used in predictive modeling, and substantially eliminates problems of multicollinearity such as related to overfitting which are inherent in machine learning involving a plurality of input variables, interactions between input variables, and nonlinear variables.

13. The system of claim 1 wherein said method employs binary, nominal, ordinal, or interval category target class variables.

* * * * *

UNITED STATES PATENT AND TRADEMARK OFFICE
CERTIFICATE OF CORRECTION

| | | |
|---|---|---|
| PATENT NO. | : 8,032,473 B2 | Page 1 of 1 |
| APPLICATION NO. | : 12/183836 | |
| DATED | : October 4, 2011 | |
| INVENTOR(S) | : Daniel M. Rice | |

It is certified that error appears in the above-identified patent and that said Letters Patent is hereby corrected as shown below:

Column 7, line 65; please delete the words "Clean version";
Column 8, line 49; please delete the words "Clean version".

Signed and Sealed this
Fourth Day of December, 2012

David J. Kappos
*Director of the United States Patent and Trademark Office*